(12) United States Patent
Li et al.

(10) Patent No.: US 7,164,489 B2
(45) Date of Patent: Jan. 16, 2007

(54) RECTANGULAR PARTITIONING IN PRINTING ROTATED IMAGES

(75) Inventors: Chia-Hsin Li, San Jose, CA (US); Brian Chan, Palo Alto, CA (US)

(73) Assignee: Seiko Epson Corporation, Tokyo (JP)

( * ) Notice: Subject to any disclaimer, the term of this patent is extended or adjusted under 35 U.S.C. 154(b) by 957 days.

(21) Appl. No.: 10/029,777

(22) Filed: Oct. 19, 2001

(65) Prior Publication Data

US 2003/0076534 A1 Apr. 24, 2003

(51) Int. Cl.
*G06F 15/00* (2006.01)

(52) U.S. Cl. .................. 358/1.16; 358/1.9; 382/298; 382/305; 345/536; 345/537; 345/543

(58) Field of Classification Search .............. 358/1.16, 358/1.15; 382/305, 298; 345/536–537, 345/543

See application file for complete search history.

(56) References Cited

U.S. PATENT DOCUMENTS

| 4,168,488 A | 9/1979 | Evans |
| 4,545,069 A | 10/1985 | Kermisch |
| 4,627,020 A | 12/1986 | Anderson et al. |
| 4,736,442 A | 4/1988 | Kornfeld |
| 4,806,920 A | 2/1989 | Sawada |
| 4,992,959 A * | 2/1991 | Hamada et al. ............ 358/1.11 |
| 5,012,434 A * | 4/1991 | Zietlow et al. ............ 358/1.18 |
| 5,487,137 A | 1/1996 | Matsuhira |
| 5,657,431 A * | 8/1997 | Plakosh et al. ............ 358/1.16 |
| 5,960,165 A | 9/1999 | Kakuno et al. |
| 5,969,828 A * | 10/1999 | Kawasaki et al. .......... 382/235 |
| 6,104,843 A * | 8/2000 | Nakashima .................. 382/305 |
| 6,266,451 B1 * | 7/2001 | Charrier et al. ............. 382/249 |
| 6,269,190 B1 * | 7/2001 | Mikkelsen et al. ......... 382/232 |
| 6,330,374 B1 * | 12/2001 | Yamaguchi et al. ........ 382/297 |
| 6,473,123 B1 * | 10/2002 | Anderson ................ 348/230.1 |
| 6,714,205 B1 * | 3/2004 | Miyashita et al. .......... 345/536 |
| 6,809,834 B1 * | 10/2004 | Sato .......................... 358/1.16 |
| 2002/0021455 A1 * | 2/2002 | Ishii et al. .................. 358/1.15 |
| 2002/0054309 A1 * | 5/2002 | Rao ........................... 358/1.9 |

* cited by examiner

*Primary Examiner*—Joseph R. Pokrzywa
*Assistant Examiner*—Mark R. Milia
(74) *Attorney, Agent, or Firm*—Rosalio Haro

(57) ABSTRACT

A rotated representation of an image is printed by using a coordinate system to assign tile divisions to the image. The size of the tile divisions are selected to maintain their area equal to, or less, than a predetermined maximum. Each segment of the image, as defined by the tile delineations, is sent separately to a data processing unit for processing. The received tile is assigned new coordinate dictating its new target position on a printed page, and its relation to the other tiles. The tile is itself further rotated prior to being send to the printer.

20 Claims, 5 Drawing Sheets

| | ACTIVITY_1 (GREETING CARDS) | ACTIVITY_2 (BUSINESS CARD) | ACTIVITY_3 (BOOK COVER) | ACTIVITY_4 (DECORATIVE GIFT BOX) | ... | ACTIVITY_m (PICTURE FRAME) |
|---|---|---|---|---|---|---|
| PRINTER_1 | X | X | | | | |
| PRINTER_2 | X | X | X | | | |
| PRINTER_3 | X | | X | | | |
| PRINTER_4 | X | | | X | | X |
| PRINTER_5 | X | X | X | X | | |
| ⋮ | ⋮ | ⋮ | ⋮ | ⋮ | ⋮ | ⋮ |
| PRINTER_n | X | X | X | X | | X |

RECTANGULAR PARTITIONING IN PRINTING ROTATED IMAGES

BACKGROUND OF THE INVENTION

1. Field of the Invention

This invention relates generally to a method of controlling the rotating and printing of larger files, specifically when executing the rotate and print command from within a Java™ based application.

2. Description of the Related Art

There are various difficulties in providing an application remotely over a computer network to an end user. These difficulties are increased when the computer network is the internet. In regards to the internet, a first difficulty is in dealing with different operating system platforms that an end user, or remote user, may use. A second difficulty is the limitations in transmission bandwidth available to a remote user. This second difficulty is exasperated when one wishes to provide a graphics intensive application, such as image editing, over the internet. A third difficulty pertains to how to make the application workable with the varying capabilities of each remote user's individual computing device, or machine. For example, a first remote user may have a fast computer with much available memory while a second remote user may have a slower machine with a minimum amount of memory.

Various approaches have been tried to overcome the above difficulties. The first issue of how to deal with different operating systems, or platforms, has been addressed with the creation of platform independent internet, or web-based, browsers. Typically, a specialized browser is constructed for each platform, but each browser is designed to respond similarly to command scripts from a web-page authoring language, such as HTML and its deviants. Such web-page authoring languages, however, are limited in capabilities and various applications languages have therefore been developed to augment their functionality.

Java™ is one such application language that has gained much popularity, and contains built-in support for the internet, or world wide web. When compiled, a Java application generates byte codes that are interpreted on a Java virtual machined for interfacing with a machine's particular platform. A specialized virtual machine needs to be created for each platform, but once constructed, one can ideally create a single Java-based application that will run on several different computer platforms by virtue of their respective Java virtual machines. Another reason for Java's popularity is its ability to create programs designed to run as part of the web browser, referred to as applets, and programs designed to run as stand-alone, web-independent programs, referred to as Java apps. However, since Java runs on an intermediate layer of software, i.e. the platform-specific virtual machine, it can be slower than native code, which is compiled and optimized specifically for a target computer platform. To mitigate this speed penalty, several web browsers have implemented the use of just-in-time compilation to convert Java byte codes into a native programs when a Java applet is received. Additionally, and unlike native code, a Java applet or app can typically not gain access to any machine resources not specifically provided to it by the Java virtual machine. To address the resource limitation issue, a Java native interface has been added to the Java language to permit Java code to pass parameters between itself and native code written in a different computer language.

The second difficulty of low transmission bandwidths is typically addressed by reducing the capability of the web-based application, requiring that the remote user obtain a higher frequency access channel, or downloading an application once and having it incorporated into, or "plugged-in" to, the user's web browser's capabilities. Although it may still take a long time to down load an application, at least it only needs to be done once.

The third difficulty of how to deal with the differing computing capabilities of different end users is more difficult to address since, as explained above, access to a computer's hardware resources are typically limited in Java. Additionally, often times the capabilities of a web browser or virtual machine are further limited by engineers in charge of maintaining local networks in order to exert a greater control over the types of applications and computer resources available to an end user. Thus, this problem is usually addressed by posting a warning to a prospective end user listing the minimum computing capacity required to adequately run an internet application. The remote user must then determine if he possesses the required computing capacity, and if not, then determine whether to download and run the application in spite of possible low performance or incompatibility issues.

The above described issues are especially important when one wishes to provide an image editing application over the internet. A first reason for this is that if one wishes to permit the printing of a high-quality downloaded image, then the image should ideally be of high resolution. However, a high resolution image requires a large image file size, whose transmission is hampered by the relatively low transfer frequencies available to most remote users. For example, a high resolution image suitable for high quality printing may be several megabytes in size, and this would mean that a remote user would potentially need to wait an exorbitant amount of time to download the image before even beginning to use the image editing application.

Large image files pose another problem. As it is known in the art, a computing device, such as a remote user's personal computer, uses a large and permanent nonvolatile memory space, typically a hard drive, for storing permanent data, and uses a smaller random access memory, RAM, to manipulate data during the execution of an application. The reason this is pertinent to the present issue is that the size of a high resolution image file may actually be greater than the amount of RAM memory available to a remote user. Since Java has a minimum ability to control, and therefore to manage, hardware resources on a remote user's machine, it is quite likely that the application would cease to function, i.e. "crash", when attempting to manipulate such a large image file. Even if one manages to overcome the above-described problems associated with a large image file, the end objective of simply printing the image poses its own compilations.

There are various revisions of Java available to a remote user. Earlier versions of Java supported no, and later only limited, printing capability. Only recently with the advent of "Java 2" has practical print functionality been made available. Thus, if one wishes to provide a Java-based application with printing functionality, one would presumably require that the end user upgrade his Java virtual machine to a version of "Java 2" or greater. This is generally not practical since it places an undue burden on the end user, especially if Java 2 is not available to the end user, or not compatible with the end user's computing resources.

Additionally, one cannot assure consistent print quality across all platforms to all end users using Java's printing functions. When printing in Java, one creates a print manager process that interfaces with a Java print formatting object and the printer's driver. The print manager process provides the user with the printer driver's graphics user interface, GUI, to collect page format and ink option details. The printer manager then sends kind of blank page to the Java print formatting object in essence draw on the blank page what is to be printed. The Java print formatting object returns the page to the printer manager which then passes the page and the collected printer options to the printer driver. The Java print formatting object uses Java drawing processes for generating the image to be printed, and is thus limited by Java's capabilities. For instance, the Java print formatting object can treat the blank page passed to it like a screen canvas, and can cast graphics context into Java's Graphics2D context to make use of Graphics2D's options for selecting that an image be created with higher or lower quality. However, not all platforms support modifications of the Graphics2D rendering mode so that specifying rendering options, such as improving or maintaining a high quality image, does not guarantee that specified option will be used.

What is needed is a method of utilizing Java's established platform portability to provide multiple remote users with a high quality image editing utility, while assuring reliability and providing consistent printing quality among the remote users.

OBJECTS OF THE INVENTION

Therefore, it is an object of the present invention to provide a web-based application that provides a quality printing capability to remote users, including those having different Java versions or resource restrictions.

It is another object of the present invention to simplify the use of a printer when using an image editing application.

It yet another object of the present invention to streamline the use of a web-based application.

It is still another object of the present invention to overcome some of the performance limitation due to differing computing capabilities by different users.

It is still another object of the present invention to reduce the frequency requirements for using an on-line image editing application that provide high resolution images for high quality prints.

SUMMARY OF THE INVENTION

The above recited objects are met in a network system, or printing method, in which a network server, or application, maintains a separate list of approved printers associated with each of multiple independent utilities. Furthermore, each utility has an associated list of predetermined, and fixed, printer-setting parameters. Thus when an activity is actuated, it already knows what printer settings it requires and is assured that the settings are supported by the available printer. To ensure that this is always the case, a client user having a local printer is denied access to any utility that is not associated with the local printer. Thus, upon selection of a utility, the present network system or application, implements a verification sequence to determine if the client user has access to a local printer associated with the selected utility. If no such local printer is available to the client user, then the client user is denied access to the selected utility.

Alternatively, the network system or application, may implement a printer inquiry routine to determine the model name, or number, of local printer available prior to supplying any list of available utilities. In this manner, the client user is presented with an options list showing only the utilities that have an approved association with the client user's available local printer. If the client user does not have access to an approved printer, or does not have access to any printer, then the client user is denied access to all utilities.

Furthermore, a library of available target images maintains an image set for each downloadable target image. Each set includes a thumbnail representation of the target image, a screen representation of the target image, and a printer representation of the target image. The screen representation has a resolution similar to that of a typical computer monitor, and is of higher resolution than the thumbnail representation. The printer representation image is of higher resolution than the screen representation image. When a client user is granted access to a utility, the client user is presented with the thumbnail images to select from. Once a selection is made, the client user is presented with the screen representation image for editing on the computer monitor. If the client user wishes to print the edits, then the printer representation image is transferred to the client user.

Since the printer representation image may be larger than the amount of RAM memory available to the client user, the printer representation image is divided into multiple tile images of size smaller than the available RAM. Each tile is then treated as an independent image file, and separately manipulated and separately sent to be printed. A coordinate system is used to maintain track of the appropriate location of each tile relative to each other.

The preferred method for splitting an image into tiles includes the following sequence steps:

define a maximum image area corresponding to a predetermined amount of memory capacity, such as that defined by available RAM space;

if the area of a target image tile is greater than the defined maximum image area then execute the following sub-steps:
  (a) compare the height of the target image tile, defined as its vertical side, to its width, defined as its horizontal side;
  (b) if its height is greater than its width, then split the target image tile horizontally along its vertical side to create an upper sub-image tile and a lower sub-image tile of substantially equal size;
  (c) if its width is greater than its height, then split the target image tile vertically along its horizontal side to create a left sub-image tile and a right sub-image tile of substantially equal size;
  (d) if its width and height are of equal size then split the target image tile along one of its vertical or horizontal sides to create two sub-image tiles of substantially equal size;
  (e) assign new coordinates to the newly created sub-image tiles in relation to their relative positions, and link them together to form a growing array of sub-image tiles;
  (f) traverse the growing array of sub-image tiles, one tile at a time beginning with the first, and examining each in turn, the examination of each sub-image tile should include the following sub-steps:
    (i) check if the area of the examined sub-image tile is greater than the defined maximum image area;
    (ii) if the area of the examined sub-image tile is not greater than the defined maximum image area, then check if a next linked sub-image tile exists in the growing array, if a next linked sub-image tile does not exist then terminate the execution of step (f) and steps (i) to (vi), otherwise return to step (i) to examine the next linked sub-image tile in the growing array;

(iii) if the area of the examined sub-image tile is greater than the defined maximum image area, then compare its height, defined as its vertical side, to its width, defined as its horizontal side;

(iv) if the height of the examined sub-image tile is greater than its width, then split the examined sub-image tile horizontally along its vertical side to create a new upper sub-image tile and a new lower sub-image tile of substantially equal size, assign the coordinate location of the originally examined sub-image tile to the new upper sub-image tile, assign new coordinates to the new lower sub-image tile in relation to its position relative to the new upper sub-image tile, and inserting the new lower sub-image tile in the growing array between the location of the originally examined sub-image tile and the previously next linked sub-image tile to be examined;

(v) if the width of the examined sub-image tile is greater than its height, then split the examined sub-image tile vertically along its horizontal side to create a new left sub-image tile next and a new right sub-image tile, assign the coordinate location of the originally examined sub-image tile the new left sub-image tile, assign new coordinates to the new right sub-image tile in relation to its position relative to said new sub-image tile, and insert it in the growing array between the location of the originally examined sub-image tile and the next linked sub-image tile to be examined; and (vi) if the width of the examined sub-image tile is equal to its height, then following the splitting description in either of steps (iv) or (v) and then proceed to step (vii);

(vii) return to step (i) and proceeding to examine the first sub-image tile in the growing array.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
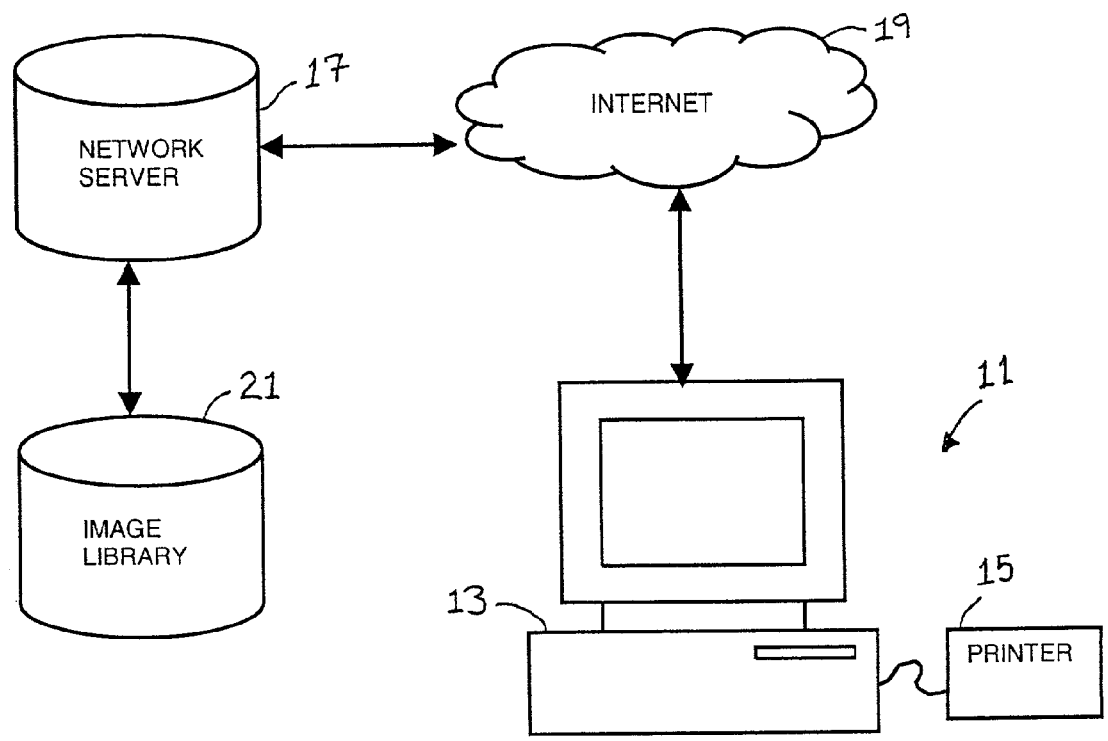
FIG. 1 is network system in accord with the present invention.

With reference to FIG. 1, a network system in accord with the present invention includes a network server 17 in communication with a client station 11 for a remote user. Preferably, network server 17 communicates with client station 11 via the internet 19. User station 11 includes a client computing device, such as computer 13, linked to the internet 19 and coupled to a local periphery device, such as printer 15.

In the presently preferred embodiment, network server 17 may supply multiple image editing utilities to user station 11, and is therefore shown having access to an image library 21. It is to be understood that image library 21 may an integral part of network server 17 and is shown separate from server 17 purely for illustrative purposes.

Figures 2, 3:
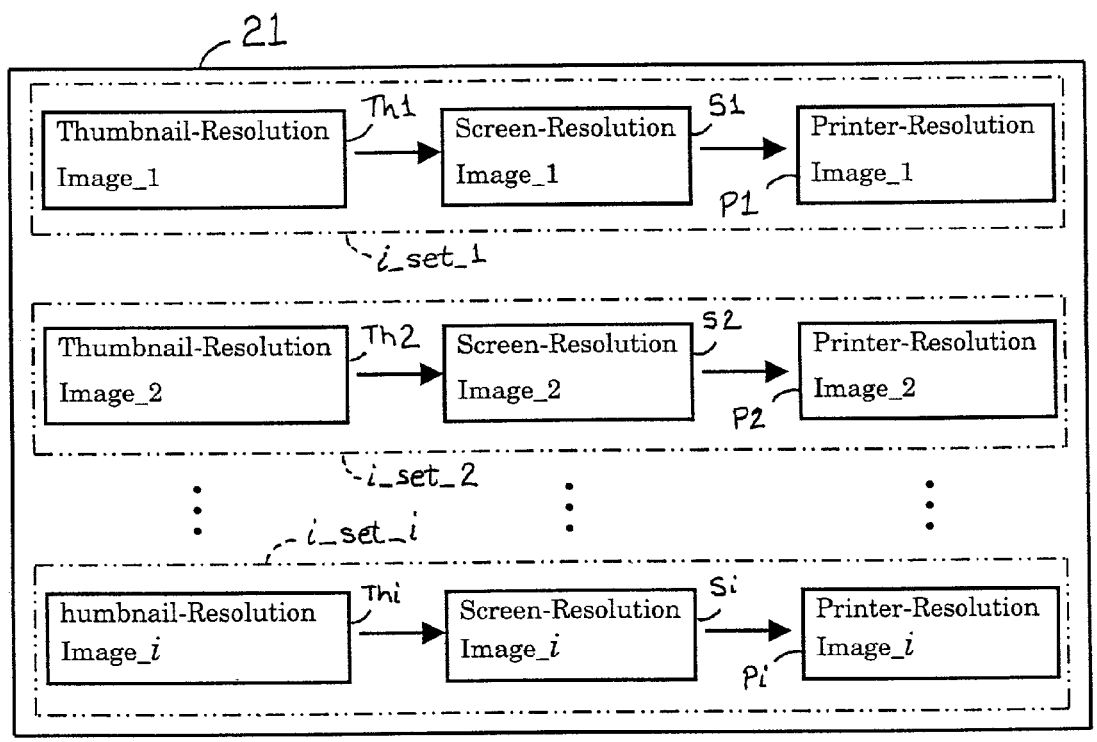
FIG. 2 is a table showing associations between multiple printer models and independent activities.
FIG. 3 is an internal view of the image library 12 of FIG. 1 showing multiple image sets.

With reference to FIG. 2, network server 17 may selectively provide any of activity_1 to activity_m to client station 11. Preferably each of activity_1 to activity_m are independent image editing activities. In other words, any one of activity_1 to activity_m may run independent of the others, not requiring any routines or assistance from the others. Illustratively, each of activity_1 to activity_m is shown to be a type of image editing activity. Because each of activity_1 to activity_m is a specialized image editing activity, each has various usage requirements. For example, activity_1 is identified as a greeting card activity and it would permit a remote user at client station 11 of FIG. 1 to create and edit any of multiple types of greeting cards using any combination of images either supplied by network server 17 from image library 21 or local images locally available to computer 13, such as any images stored within computer 13. Indeed, it is preferable that each of activity_1 to activity_m require that at least one image be transferred from image library 21.

Activity_2 is identified as a business card activity and it would, for example, provide client station 11 with multiple card patterns, business related images from image library 21, and text editing capabilities.

Activity_3 represents a book cover creating activity. In this case, a user at user station 11 may be presented with various images and patters for printing onto a book cover medium, such as a large sheet of plane or matte paper. The size of the book cover medium may range from relatively small to A4 size to poster size 17"×22", or larger. In this case, it is preferably that a separate selection option be provided for each paper size associated with each book cover creation activity. For example, in FIG. 2 only activity_3 is identified as a book cover activity and it would therefore support only one size of paper, such as the aforementioned poster size. If it were desirable that another paper size be supported, then an another activity selection option would be added to the list of available activities. That is, an activity_i−1 for selecting a book cover creation utility on A4 size paper may be added to the list of available activities.

Activity_4 is illustratively shown as an activity for creating decorative boxes. In this case, the activity may print the outline pattern of a foldable box on a printing media, such as heavy weight paper or cardboard, and provide images for decorating the box sides. Since the expected printing media is relatively thick, activity_4 may also include a pre-set printing parameter requiring that a larger amount of ink be used during printing to assure proper ink saturation into the printing media.

The last exemplary activity shown is activity_m, representing a picture frame creating activity. In this case, the activity would permit a remote user at client station 11 to create and edit decorative picture frames on a printing media. The printed frames may be cut and thereby be made suitable for displaying pictures.

It is to be understood that the above enumerated activities are for illustrative purposes, and that multiple additional image editing utilities may be added, such as photo editing and paper fan creating activities.

In the preceding description of activity_1 to activity_m, it was explained that some of the activities have predetermined, and pre-set, print parameters. However, it is preferred that all the printing parameters be pre-set, and fixed, for each of activity_1 to activity_m. That is, each activity may have an associated file containing a printer parameter list specifying its preferred paper size, paper type (i.e. plane, photo, cardboard, etc.), paper weight, paper surface (such as matte, glassy, plane), and margins. Additional preset printer preferences included in each associated file may include the use of color or black-and-white printing, print media orientation (i.e. landscape or portrait), as well as ink saturation properties such as having a parameter for each activity defining a compromised between print speed versus print quality. These predetermined print preference setting are preferably not alterable by the end user.

Since not all printers can support all the pre-set printer parameters listed in each activity's associated file, each activity preferably also includes a list of pre-approved printers with which it is compatible. For example, the table of FIG. 2 illustratively correlates printer_1 to printer_n to their respective associated activities. As shown, each of activity_1 to activity_m may be associated with more one printer, and vise versa. In present case, activity_1 is associated with each of printer_1 to printer_n, which means that an end user at client station 11 of FIG. 1 may access activity_1 as long as printer 15 is any one of approved printer models printer_1 to printer_n. Activity_2 is shown associated with printer_1, printer_2, printer_5 and printer_n, which means that client station 11 can access activity_2 only if printer 15 is any one of approved printer models printer_1 printer_2, printer_5 and printer_n. A similar correlation is shown between activity_3 and approved printer models printer_2, printer_3, printer_5, and printer_n; between activity_4 and printer_4, printer_5, and printer_n; and activity_m and printer_1 to printer_n.

The file used to associate an activity to a list of approved printers, can alternatively be used to associate a printer with a list of correspondingly approved activities. For example, if printer 15 of FIG. 1 is model printer_3, then client station 11 can gain access only to activity_1 and activity_4 since they are the only activities shown associated with printer_3 in FIG. 2. However, if printer 15 is printer model printer_n, then client station 11 can gain access to all of activity_1 to activity_m.

The above described, approved printer model-to-permissible activity association is preferably enforced by network server 17 of FIG. 1. In a first approach, network server 17 responds a remote user on client station 11 by first supplying the end user with an options list showing activity_1 to activity_m. The end user is preferably permitted to selection only one of activity_1 to activity_m in response to the options list. Network server 17 may then provide client station 11 with a second options list showing approved printer models printer_1 to printer_n, and request that the end user identity its periphery device, i.e. printer 15, as one of printer_1 to printer_n. At this point, network server 17 may check the list of approved periphery devices, i.e. printer models, associated with the selected activity. Alternatively, network server may request information about the printer driver installed on computer 13 to verify that the selected printer model does indeed match printer 15, and that the printer driver is current. In still another approach, network server 17 does not provide client server with a list of printer_1 to printer_n, but rather requests that computer 13 interrogate printer 15 to request its model name, or number, and convey that information to network server 17. In either case, once network server 17 has ascertained the model name of printer 15 and checked it in the selected activity's file of associated printers, client 11 is denied access to the selected activity if printer 15 is not among the activity's list of associated printer models, and is granted access to the selected activity otherwise.

In a second approach toward enforcing the above described correlation, network server 17 responds a remote user on client station 11 by first supplying the end user with an options list of approved printer models printer_1 to printer_n, and requesting that printer 15 be identified from among the list. As in the previous case, network server may request information about the printer driver installed on computer 13 to verify the information regarding printer 15. Alternatively, network server 17 may request that computer 13 interrogate printer 15 to determine its model name, or number. Once the identity of printer 15 is ascertained, network server 17 may check if printer 15 is one of approved printer_1 to printer_n. If printer 15 is not an approved printer, then client station is not permitted access to any of activity_1 to activity_m. If printer 15 is one of the approved printers, then client station 11 is presented with another options list showing only the activities associated with printer name of printer 15. For example, if printer 15 is model printer_3 then client station is provided with an option list showing only activity_1 and activity_3, as specified by the table in FIG. 2. On the other hand, if printer 15 is model printer_n, then client station 11 is provided with an option list showing each of activity_1 to activity_m as available selection options.

Once client station 11 has gain access to one of activity_1 to activity_m, the next issue to address is the question of speeding up the transfer of an editable image over the internet 19. With reference to FIG. 3, image library 21 preferably maintains a plurality of image set, i_set_1 to i_set_i, one for each image available for download from network server 17 to work station 11. Each image set, i_set_1 to i_set_i, includes three different resolution representations of the same image. For example, image set i_set_1 includes a low resolution thumbnail-representation file Th1 of imaged_1, an intermediate resolution screen-representation file S1 of image_1 and a high resolution printer resolution file P1 of image_1. Preferably, the screen-representation images S1–Si have a resolution typical of most computer monitors, and have a size of at least about 5 times larger than the size of the thumbnail representation images Th1–Thi. Also preferably, the printer-representation images P1 to Pi have a resolution suitable for high-end quality printers, and have a size of about 6, or preferably more, times greater than the screen-representation images S1–Si.

Figure 4:
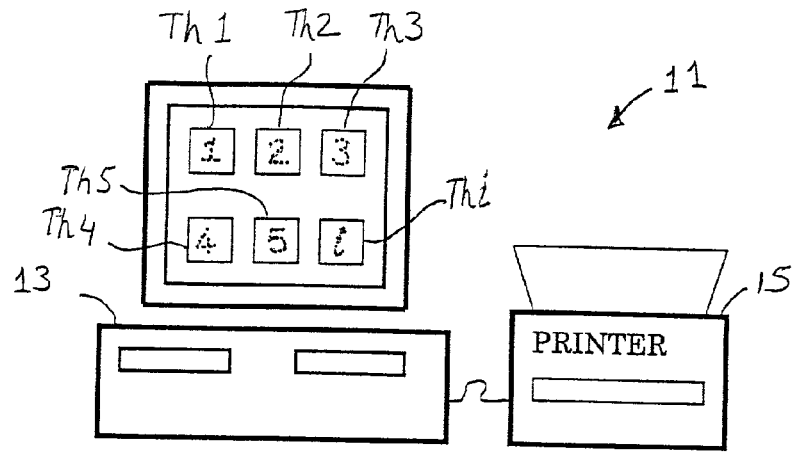
FIG. 4 is a client station showing thumbnail representations of images.
Figure 5:
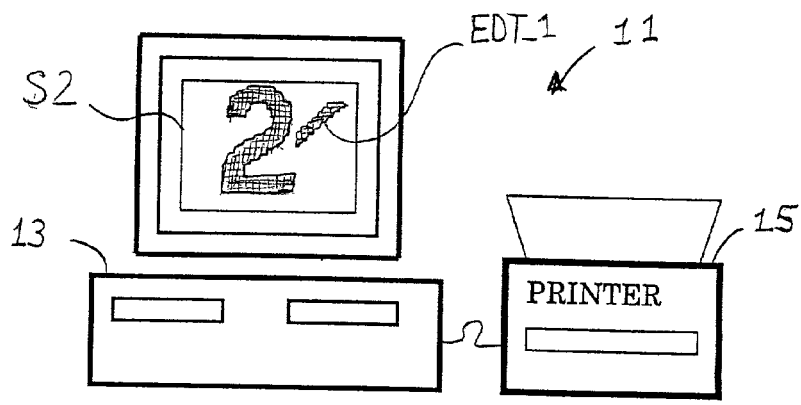
FIG. 5 is a client station showing a screen representation of an image.

With reference to FIG. 4, when client station 11 gains access to an activity, network server 17 transfers the thumbnail-representation images Th1–Thi corresponding to all the images associated with the selected activity. The client station 11 is then requested to select an image from among thumbnail images Th1–Thi. Once a thumbnail image is selected, the screen-representation image corresponding to the thumbnail image is transferred from network server 17 to client station 11. As an example, one may assume that an end user at client station 11 selected thumbnail image Th2, which is illustratively shown to consist of an image of numeral "2". FIG. 5 then shows that network server 17 responds by sending the corresponding screen-representation image S2 to client station 11 for display on computer 13. As illustrated, screen-representation image S2 is displayed on the display of computer 13, and is of higher resolution than the thumbnail representation image Th2, but is still not necessarily a high resolution image. The end user at client station 11 may then edit image S2 as desired. An edit mark EDT_1 is representatively shown added to image S2 on the display of computer 13.

Figure 6:
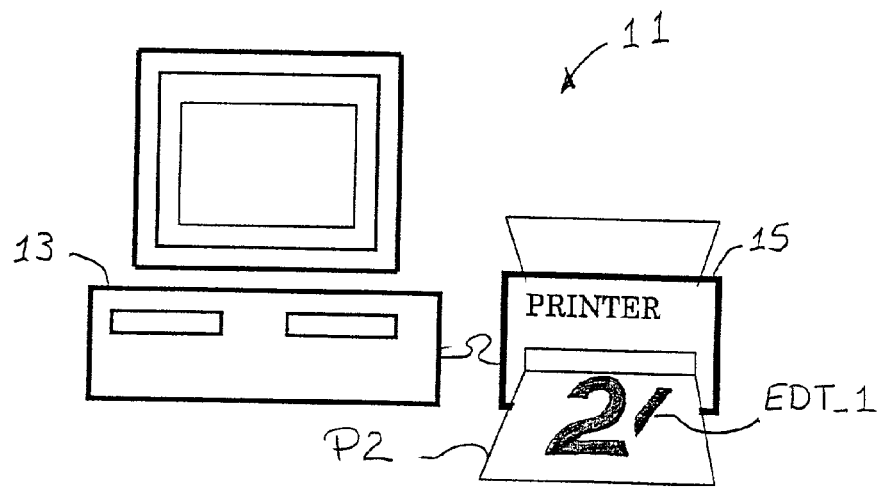
FIG. 6 is a client station showing a printer representation of the screen representation image of FIG. 5.

At this point, the end user may decide to disregard all edits and close the application without printing. If this is the case, then the image editing application of the present invention would have permitted quick access to all the images and to the utilities without requiring an a long wait for downloading a high resolution image. However, if the user decides to print the image, then network server 17 responds by transferring the corresponding high resolution, printer-representation image P2. As shown in FIG. 6, the downloaded image P2 is then edited to recreate the same edits committed to the corresponding screen image S2 prior to printing. Therefore, the image P2 coming out of printer 15 is shown to also include an edit mark EDT_1 similar to that added to image S2 in FIG. 5.

As explained above, various complications arise when trying maintain consistent print quality among multiple remote user while using Java, especially if using a relatively larger file, such as printer-representation images P1–Pi. Before discussing how the present invention addresses these complications, it would be advantageous to explain the manner in which files are typically manipulated.

Figure 7:
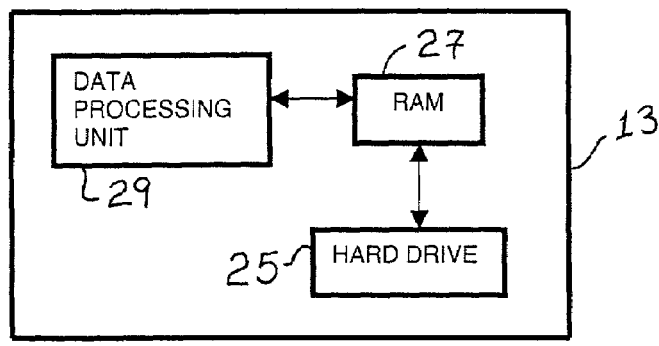
FIG. 7 is a simplified view of some of the internal components of computer 13 shown in FIG. 1.

With reference to FIG. 7, a simplified view of some typical internal components of computer 13 are shown. Specifically, first memory space 25 is used to hold the transferred high resolution image, in the above example image P2. In the present illustrative case, first memory space 25 is preferably implemented as a hard drive, which is a nonvolatile and high capacity storage device. Hard drive 25 has a communication link 28 with a second memory space 27. The second memory space is used by a data processing unit 29 to manipulate image data. As it is known in the art, this type of memory is generally a bank of fast, but volatile memory, presently represented as RAM memory 27.

Figure 8:
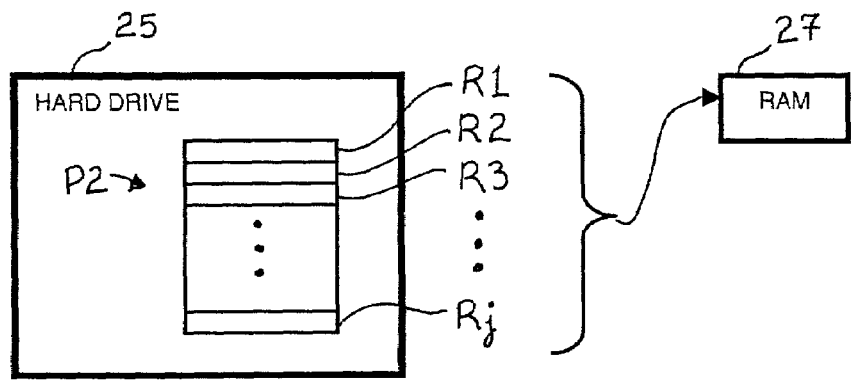
FIG. 8 is represents the transferring of image rows from hard drive 25 to RAM 27.

With reference to FIG. 8, a symbolic view of the internal contents of hard drive 25 shows printer-representation image P2 stored within it. Typically, one would like to move the entire image P2 into RAM 27, but as explained above, image P2 may be larger than the storage capacity of RAM 27 and this may therefore not be an option. In this situation, one typically splices the image P2 into multiple image rows R1–Rj, and send each spliced row, one at a time, to RAM 27 for printing. This approach is typical of most line printers, such as dot matrix and inkjet printers, which print one line at a time. However, if one want to rotate image P2 from portrait format to landscape format, or to any other orientation, one would typically be forced to first transfer the entire image P2 to RAM 27.

Figure 9:
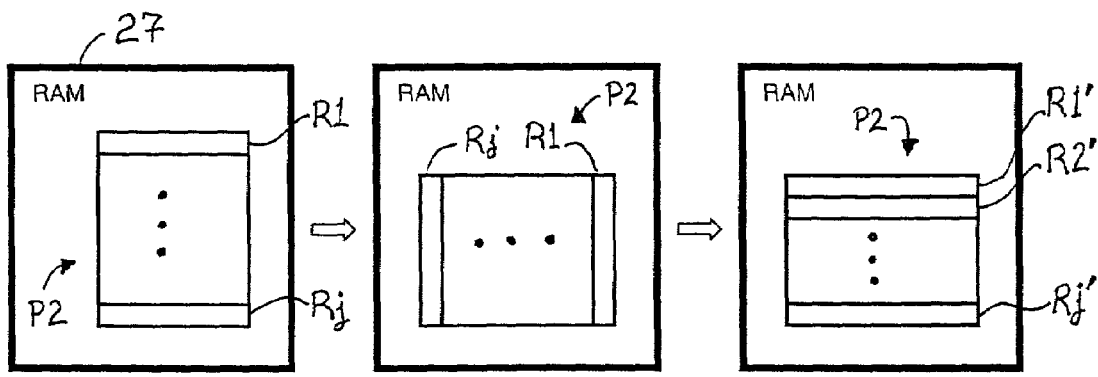
FIG. 9 shows the typical rotation of an image in preparation for printing.

With reference to FIG. 9, image P2 is shown stored in RAM 27, in its entirety, with spliced rows R1 and Rj illustrated. The reason for having to move P2 completely within RAM 27 is that dot matrix printers and inkjet printers are line printers and require one row of image data at a time. However, when image P2 is rotated, splice row R1 becomes a column and can no longer be use for sending to a line printer. The rotated image needs to be re-spliced and new rows of image data R1' to Rj' created. This can typically only be done by rotating all of image P2 at the same time, and since this is a type of image data manipulation, data processing unit 29 requires all of image P2 be within RAM 27 before rotating. But as explained above, image P2 is likely to be too large to fit within RAM 27 and will therefore lead to errors. Thus, attempting to rotate a large image can cause a computing device, such as computer 13, to run into errors and cease to function, or crash.

Figure 10:
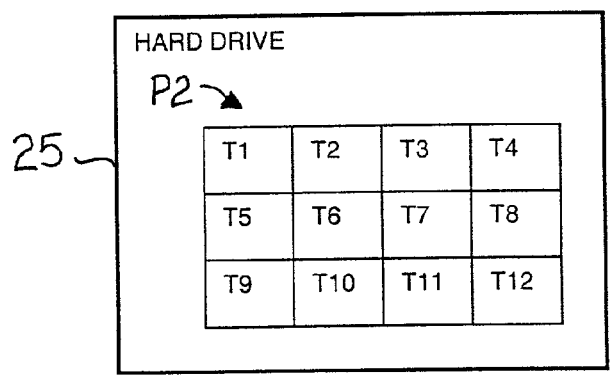
FIG. 10 shows the tiling of an image in accord with the present invention.

With reference to FIG. 10, in the present invention, an image, such as image P2, is divided into a plurality of tiles (in this case, T1–T12) while still stored within hard drive 25. This is accomplished by assigning a cartesian coordinate system to image P2, which defines the size and relative location of each tile, and then manipulating the coordinates tiles instead of the image data itself. First, an appropriate maximum size for each tile is selected. The selected maximum size area is preferably not greater than the size of RAM 27, and can be set to be a predetermined fraction of the size of RAM 27. The size of available RAM can be easily determined by computer 13, itself. Image P2 is then divided into tiles of area preferably equal to, but not greater than, the selected maximum area. For ease of construction, the tiles are preferably square or rectangular in shape.

Figure 11:
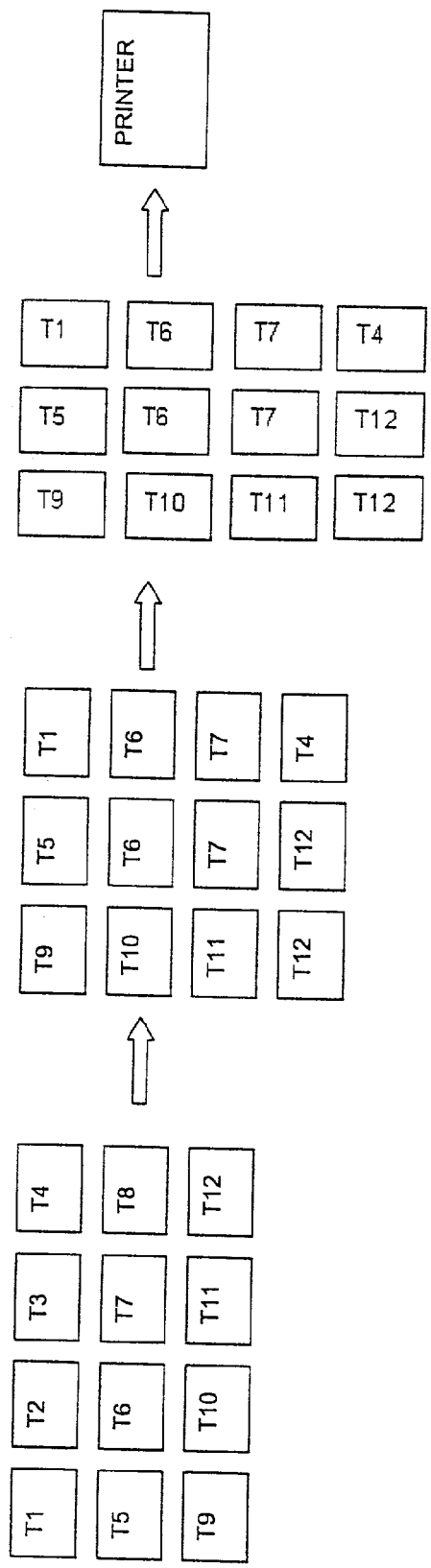
FIG. 11 illustrates the use of tile images to rotate a larger image for printing.
Figure 12:
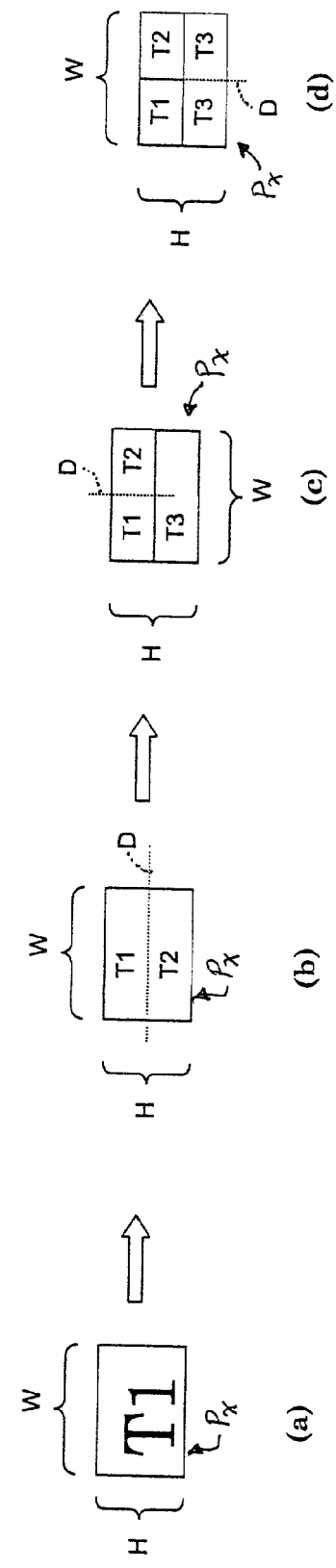
FIG. 12 illustrates a preferred method for splitting a larger image into multiple smaller tile images.

With reference to FIG. 11, each tile in essence becomes an autonomous sub-image file, and the original image P2 is the composite of all the tile sub-images, T1–T12. To print a rotated representation of the original image P2, one sends one tile at a time to RAM 27, and data processing unit 29 then reassigns new coordinates to the tile that effectively shift it to its new target location on the printed page. Data processing unit 29 may also rotate the tile image accordingly to maintain a consistent composite of original image P2. The tile is then sent to a printer driver, which may collect all the received image tiles in a spool until the entire image P2, or its rotated representation, is reconstructed. In this case the order in which tiles T1–T12 are sent to RAM 27 is not critical.

To simplify matters, however, the transferring of image tiles from hard drive 25 to RAM 27 can be made dependent on whether one wishes to print a direct representation of image P2 or a rotated representation of image P2. If the image does not need to be rotated, then one can send the tiles to RAM 27 in alignment with the rows of tile of the original image P2, one row at a time. If the image needs to be rotated, then one can send the tiles in alignment with the columns of tiles and rotate each tile in sequence, one column at a time. Therefore, it is no longer necessary for the entire image to be stored in RAM 27 prior to rotation.

Alternatively, the printer representation image P2 may be divided into tiles by network server 17, prior to sending the image P2 to the client station 11. In this case, the tiles may be stored directly within RAM 27 without the need to store the complete image (consisting of the composite of all the tiles) within a secondary memory space, i.e. the hard drive 25.

To illustrate the preferred method of splitting an image within hard drive 25 into tiles, FIG. 12a–12d shows a simplified tiling process where an image is divided into four tiles T1–T4. In 12a, image Px is compared with a predetermined maximum area, and if it is found to be greater than the predetermined maximum area then the coordinates defining the area segments of each tile are adjusted (at this point image Px has not been divided and the entire image Px forms a single tile T1, i.e. a single segment). The width W of image Px is then compared with its height H. Preferably, if the width W is greater than the height H, then the image is divided vertically down the middle of its width W. In the present case shown in FIG. 12b, the height H is greater then the width side W, and the image Px is therefore divided horizontally along the middle of its height side H, as illustrated by dividing line marker D. Each tile is then examined in turn, one at a time beginning with T1. In the present case, shown in FIG. 12c, the width of tile T1 is greater than its height, and tile T1 is therefore divided vertically down the middle of its width side to form two new tiles. The first T1, retains the name and coordinate position of original tile T1 prior to dividing, but the second, newly created tile is assigned the next tile position T2, which requires that the older tile T2 be changed to T3. In essences, one is inserting the newly created tile in between the older tiles T1 and T2 of FIG. 12b. One then returns to the first tile T1 and sequentially examines each tile in turn. In the present case, both tiles T1 and T2 are smaller than the predetermined maximum area, but tile T3 is still larger than the predetermined maximum area. Therefore in FIG. 12d, tile T3 is divided into new tiles T3 and T4.

The presently preferred method of printing a large image is implemented in native code written in, for example, the "C" or "C++" computer language and compiled separately for each platform that the utility of network server 17 may expect to interface with. When network server 17 is accessed by a client station 11, it interrogates the client station about what computer platform it, i.e. computer 13, is using and provides the appropriate native code.

To interface the present native code printing routine with the remainder of the utility, which is preferably implemented in Java, the present invention deviates form the Java print model. When a print option is selected, the present invention does not need to present the user with a printer-settings option since such options are fixed according to the each activity. The present invention then transfers the control to the native code through Java's JNI utility (java native interface) or computer 13's TCP/IP communication port. The print parameters may be a part of the native code, or may be transferred to the native code from Java. The native code tiles the image accordingly and controls the transferring to tile image from hard drive 25 to RAM 27. Preferably, the native code generates the printable image that is sent to the printer driver. This is done to avoid the inconsistencies associated with Java's print model. Thus, the native code requires the passing of information from Java specifying any edits committed to the screen-representation image, i.e. S2, by the user, and then recreates the same edits on the print-representation image, i.e. P2, one tile at a time. Since each tile is treated as a separate image, the native code sends each tile independently sent to the printer. Alternatively, the native code may transfer the edited tile image back to Java to be relayed to the printer.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A computing system for printing a target image, comprising:
    a first memory space for storing said target image;
    a second memory space smaller than said first memory space;
    a data processing unit for applying a sub-dividing algorithm to said target image to generate an array of rows and columns of sub-image tiles, each of said sub-image tiles being sized to be storable within a predetermined amount of memory capacity not greater than that of said second memory space, said target image being the composite of said sub-image tiles;
    a communication link coupling said first memory space to said second memory space for transferring each of said sub-image tiles in turn from said first memory space to said second memory space;
    said data processing unit further implementing an image generating routine for generating a printable sub-image block of each sub-image tile within said second memory space, assigning each printable sub-image block a coordinate parameter identifying a target location within a composite memory space, and transferring each printable sub-image block from said second memory space to a printer driver routine prior to transferring the next sub-image tile from said first memory space to said second memory space; wherein
    said printer driver routine correlates said composite memory space with the printable space on a printing media and controls the printing of each of said sub-image blocks to locations within said printing media in accordance with their respective coordinate parameter; and
    wherein said sub-dividing algorithm includes the following steps:
        defining a maximum image area corresponding to said predetermined amount of memory capacity;
        if the area of said target image is greater than said maximum image area then executing the following sub-steps:
            (a) comparing its height, defined as its vertical side, to its width, defined as its horizontal side;
            (b) if its height is greater than its width, then splitting said target image horizontally along its vertical side to create an upper sub-image tile and a lower sub-image tile of substantially equal size;
            (c) if its width is greater than its height, then splitting said target image vertically along its horizontal side to create a left sub-image tile and a right sub-image tile of substantially equal size;
            (d) if its width and height are of equal size then splitting said target image along one of its vertical and horizontal sides to create two sub-image tiles of substantially equal size;
            (e) assigning new coordinates to the newly created sub-image tiles in relation to their relative positions, and linking them together to form a growing array of sub-image tiles;
            (f) traversing said growing array of sub-image tiles, one tile at a time, and examining each in turn, the examining of each sub-image tile including the following sub-steps:
                (i) checking if the area of the examined sub-image tile is greater than said maximum image area;
                (ii) if the area of the examined sub-image tile is not greater than said maximum image area, then checking if a next linked sub-image tile exists in said growing array, if a next linked sub-image tile does not exist then terminating the execution of step (f), otherwise returning to step (i) to examine the next linked sub-image tile in said growing array;

(iii) if the area of the examined sub-image tile is greater than said maximum image area, then comparing its height, defined as its vertical side, to its width, defined as its horizontal side;

(iv) if the height of the examined sub-image tile is greater than its width, then splitting the examined sub-image tile horizontally along its vertical side to create a new upper sub-image tile and a new lower sub-image tile of substantially equal size, assigning the coordinate location of the originally examined sub-image tile to said new upper sub-image tile, assigning new coordinates to said new lower sub-image tile in relation to its position relative to said new upper sub-image tile, and inserting said new lower sub-image tile in said growing array between the location of the originally examined sub-image tile and the next linked sub-image tile to be examined;

(v) if the width of the examined sub-image tile is greater than its height, then splitting the examined sub-image tile vertically along its horizontal side to create a new left sub-image tile next and a new right sub-image tile, assigning the coordinate location of the originally examined sub-image tile to said new left sub-image tile, assigning new coordinates to said new right sub-image tile in relation to its position relative to said new left sub-image tile, and inserting it in said growing array between the location of the originally examined sub-image tile and the next linked sub-image tile to be examined; and (vi) returning to step (i) and proceeding to examine the first sub-image tile in said growing array.

2. The computing system of claim 1, wherein said image generating routine is further effective for:
printing a rotated representation of said target image by assigning the coordinate parameter of each said sub-image blocks such that the assigned coordinate parameter corresponds to a shifting of each sub-image tile within said array of sub-image tiles by a predetermined offset amount; and
rotating each of said sub-image blocks prior to sending them to said printer driver.

3. The computing system of claim 2 wherein said shifting of said sub-image tiles within said array of sub-image tiles corresponds to a coordinate shift within said array such that a target sub-image tile at a first corner within said array is shifted to an adjacent corner and all other sub-image tiles within said array are shifted accordingly to maintain a constant position al relation with said target sub-image tile.

4. The computing system of claim 3 wherein said sub-image tiles are transferred from said first memory space to said second memory space in a sequence order beginning with said target sub-image tile followed by adjacent sub-image tiles, in turn.

5. The computing system of claim 1, being further effective for:
printing a non-rotated representation of said target image by sending each sub-image tile from said array of sub-image tiles in alignment with each row of said array in succession; and printing a rotated representation of said target image by sending each sub-image tile from said array of sub-image tiles in alignment with each column of said array in succession.

6. The computing system of claim 1, wherein the size of said second memory space is insufficient for storing said target image in its entirety.

7. A method of printing a target image, comprising:
providing a first memory space for storing said target image;
providing a second memory space smaller than said first memory space;
applying a sub-dividing algorithm to said target image to generate an array of rows and columns of sub-image tiles, said target image being the composite of said sub-image tiles;
sizing each of said sub-image tiles to be storable within a predetermined amount of memory capacity not greater than that of said second memory space;
transferring each of said sub-image tiles in turn from said first memory space to said second memory space;
generating a printable sub-image block of each sub-image tile within said second memory space and assigning each printable sub-image block a coordinate parameter identifying a target location within a composite memory space;
transferring each printable sub-image block from said second memory space to a printer driver prior to transferring the next sub-image tile from said first memory space to said second memory space;
having said printer driver correlate said composite memory space with the printable space on a printing media and controlling the printing of each of said sub-image blocks to locations within said printing media in accordance with their respective coordinate parameter;
wherein said sub-dividing algorithm includes the following steps:
defining a maximum image area corresponding to said predetermined amount of memory capacity;
if the area of said target image is greater than said maximum image area then executing the following sub-steps:

(a) comparing its height, defined as its vertical side, to its width, defined as its horizontal side;

(b) if its height is greater than its width, then splitting said target image horizontally along its vertical side to create an upper sub-image tile and a lower sub-image tile of substantially equal size;

(c) if its width is greater than its height, then splitting said target image vertically along its horizontal side to create a left sub-image tile and a right sub-image tile of substantially equal size;

(d) if its width and height are of equal size then splitting said target image along one of its vertical and horizontal sides to create two sub-image tiles of substantially equal size;

(e) assigning new coordinates to the newly created sub-image tiles in relation to their relative positions, and linking them together to form a growing array of sub-image tiles;

(f) traversing said growing array of sub-image tiles, one tile at a time, and examining each in turn, the examining of each sub-image tile including the following sub-steps:

(i) checking if the area of the examined sub-image tile is greater than said maximum image area;

(ii) if the area of the examined sub-image tile is not greater than said maximum image area, then checking if a next linked sub-image tile exists in said growing array, if a next linked sub-image tile does not exist then terminating the execution of step (f), otherwise returning to step (i) to examine the next linked sub-image tile in said growing array;

(iii) if the area of the examined sub-image tile is greater than said maximum image area, then comparing its height, defined as its vertical side, to its width, defined as its horizontal side;

(iv) if the height of the examined sub-image tile is greater than its width, then splitting the examined sub-image tile horizontally along its vertical side to create a new upper sub-image tile and a new lower sub-image tile of substantially equal size, assigning the coordinate location of the originally examined sub-image tile to said new upper sub-image tile, assigning new coordinates to said new lower sub-image tile in relation to its position relative to said new upper sub-image tile, and inserting said new lower sub-image tile in said growing array between the location of the originally examined sub-image tile and the next linked sub-image tile to be examined;

(v) if the width of the examined sub-image tile is greater than its height, then splitting the examined sub-image tile vertically along its horizontal side to create a new left sub-image tile next and a new right sub-image tile, assigning the coordinate location of the originally examined sub-image tile to said new left sub-image tile, assigning new coordinates to said new right sub-image tile in relation to its position relative to said new left sub-image tile, and inserting it in said growing array between the location of the originally examined sub-image tile and the next linked sub-image tile to be examined; and (vi) returning to step (i) and proceeding to examine the first sub-image tile in said growing array.

8. The method of claim 7, further including:
printing a rotated representation of said target image by assigning the coordinate parameter of each said sub-image blocks such that the assigned coordinate parameter corresponds to a shifting of each sub-image tile within said array of sub-image tiles by a predetermined offset amount; and
rotating each of said sub-image blocks prior to sending them to said printer driver.

9. The method of claim 8 wherein said shifting of said sub-image tiles within said array of sub-image tiles corresponds to a coordinate shift within said array such that a target sub-image tile at a first corner within said array is shifted to an adjacent corner and all other sub-image tiles within said array are shifted accordingly to maintain a constant positional relation with said target sub-image tile.

10. The method of claim 9 wherein said sub-image tiles are transferred from said first memory space to said second memory space in a sequence order beginning with said target sub-image tile followed by adjacent sub-image tiles in turn.

11. The method of claim 7, being further including:
printing a non-rotated representation of said target image by sending each sub-image tile from said array of sub-image tiles in alignment with each row of said array in succession; and printing a rotated representation of said target image by sending each sub-image tile from said array of sub-image tiles in alignment with each column of said array in succession.

12. The method of claim 7, wherein the size of said second memory space is insufficient for storing said target image in its entirety.

13. A computer readable medium embodying computer executable instructions for printing a target image, said instructions comprising the steps of:
applying a sub-dividing algorithm to said target image for generating an array of rows and columns of sub-image tiles, each of said sub-image tiles being storable within a predetermined amount of memory capacity, said target image being the composite of said sub-image tiles;
generating a printable sub-image block of each sub-image tile in turn and assigning each printable sub-image block a coordinate parameter identifying a target location within a composite memory space;
transferring each printable sub-image block to a printer driver;
having said printer driver correlate said composite memory space with the printable space on a printing media and controlling the printing of each of said sub-image blocks to locations within said printing media in accordance with their respective coordinate parameter;
wherein said sub-dividing algorithm includes the following steps:
defining a maximum image area corresponding to said predetermined amount of memory capacity;
if the area of said target image is greater than said maximum image area then executing the following sub-steps:
(a) comparing its height, defined as its vertical side, to its width, defined as its horizontal side;
(b) if its height is greater than its width, then splitting said target image horizontally along its vertical side to create an upper sub-image tile and a lower sub-image tile of substantially equal size;
(c) if its width is greater than its height, then splitting said target image vertically along its horizontal side to create a left sub-image tile and a right sub-image tile of substantially equal size;
(d) if its width and height are of equal size then splitting said target image along one of its vertical and horizontal sides to create two sub-image tiles of substantially equal size;
(e) assigning new coordinates to the newly created sub-image tiles in relation to their relative positions, and linking them together to form a growing array of sub-image tiles;
(f) traversing said growing array of sub-image tiles, one tile at a time, and examining each in turn, the examining of each sub-image tile including the following sub-steps:
(i) checking if the area of the examined sub-image tile is greater than said maximum image area;
(ii) if the area of the examined sub-image tile is not greater than said maximum image area, then checking if a next linked sub-image tile exists in said growing array, if a next linked sub-image tile does not exist then terminating the execution of step (f), otherwise returning to step (i) to examine the next linked sub-image tile in said growing array;

(iii) if the area of the examined sub-image tile is greater than said maximum image area, then comparing its height, defined as its vertical side, to its width, defined as its horizontal side;

(iv) if the height of the examined sub-image tile is greater than its width, then splitting the examined sub-image tile horizontally along its vertical side to create a new upper sub-image tile and a new lower sub-image tile of substantially equal size, assigning the coordinate location of the originally examined sub-image tile to said new upper sub-image tile, assigning new coordinates to said new lower sub-image tile in relation to its position relative to said new upper sub-image tile, and inserting said new lower sub-image tile in said growing array between the location of the originally examined sub-image tile and the next linked sub-image tile to be examined;

(v) if the width of the examined sub-image tile is greater than its height, then splitting the examined sub-image tile vertically along its horizontal side to create a new left sub-image tile next and a new right sub-image tile, assigning the coordinate location of the originally examined sub-image tile to said new left sub-image tile, assigning new coordinates to said new right sub-image tile in relation to its position relative to said new left sub-image tile, and inserting it in said growing array between the location of the originally examined sub-image tile and the next linked sub-image tile to be examined; and (vi) returning to step (i) and proceeding to examine the first sub-image tile in said growing array.

14. The computer readable medium of claim 13, further including the steps of:

printing a rotated representation of said target image by assigning the coordinate parameter of each said sub-image blocks such that the assigned coordinate parameter corresponds to a shifting of each sub-image tile within said array of sub-image tiles by a predetermined offset amount; and rotating each of said sub-image blocks prior to sending them to said printer driver.

15. The computer readable medium of claim 14, wherein said shifting of said sub-image tiles within said array of sub-image tiles corresponds to a coordinate shift within said array such that a target sub-image tile at a first corner within said array is shifted to an adjacent corner and all other sub-image tiles within said array are shifted accordingly to maintain a constant positional relation with said target sub-image tile.

16. The computer readable medium of claim 15, wherein said sub-image tiles are converted to sub-image blocks in a sequence order beginning with said target sub-image tile followed by adjacent sub-image tiles in turn.

17. The computer readable medium of claim 13, being further including:

printing a non-rotated representation of said target image by sending each sub-image tile from said array of sub-image tiles in alignment with each row of said array in succession; and printing a rotated representation of said target image by sending each sub-image tile from said array of sub-image tiles in alignment with each column of said array in succession.

18. The computing system of claim 1, wherein said target image in said first memory space encompasses an entire page of said printing media.

19. The method of claim 7, wherein said target image in said first memory space is made to encompass an entire page of said printing media.

20. The computer readable medium of claim 13, wherein said a target image encompasses an entire page of said printing media.

* * * * *